United States Patent
Mizumaki (10) Patent No.: US 8,696,222 B2
(45) Date of Patent: Apr. 15, 2014

(54) IMAGE-PICKUP APPARATUS (71) Applicant: Canon Kabushiki Kaisha, Tokyo (JP)

(72) Inventor: Masao Mizumaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/892,833

(22) Filed: May 13, 2013

(65) Prior Publication Data

US 2013/0308935 A1 Nov. 21, 2013

(30) Foreign Application Priority Data

May 21, 2012 (JP) ................................. 2012-115263

(51) Int. Cl.
*G03B 19/12* (2006.01)
(52) U.S. Cl.
CPC ..................................... *G03B 19/12* (2013.01)
USPC ........................................................ 396/358
(58) Field of Classification Search
CPC ............................... G03B 19/12; G03B 19/20
USPC .......................................... 396/354, 356, 358
See application file for complete search history.

(56) References Cited

U.S. PATENT DOCUMENTS

| | | | | |
|---|---|---|---|---|
| 4,431,285 A | * | 2/1984 | Kajita et al. | 396/272 |
| 4,443,083 A | * | 4/1984 | Nakano | 396/354 |
| 6,227,727 B1 | * | 5/2001 | Mielke | 396/358 |
| 2001/0005232 A1 | * | 6/2001 | Yoshioka et al. | 348/341 |

FOREIGN PATENT DOCUMENTS

| | | |
|---|---|---|
| JP | 11-095317 A | 4/1999 |
| JP | 2007-139832 A | 6/2007 |
| JP | 2010-044271 A | 2/2010 |

* cited by examiner

*Primary Examiner* — Rodney Fuller
(74) *Attorney, Agent, or Firm* — Cowan, Liebowitz & Latman, P.C.

(57) ABSTRACT

An image-pickup apparatus includes a lead screw, a moving member, an image-pickup element, a mirror member that is capable of rotating between a first state and a second state, an urging member, and a first abutment member configured to abut against the mirror member when the mirror member is in the first state. An engagement portion parallel to a rotational axis of the mirror member is protruded from the mirror member. The engagement portion is held by both ends of the urging member when the mirror member rotates between the first state and the second state. A first end of the urging member elastically deforms so as to be apart from the engagement portion when the mirror member abuts against the first abutment member.

6 Claims, 6 Drawing Sheets

IMAGE-PICKUP APPARATUS

BACKGROUND OF THE INVENTION

1. Field of the Invention

The present invention relates generally to an image-pickup apparatus and more particularly to an image-pickup apparatus having a rotatable mirror drive mechanism.

2. Description of the Related Art

A single-lens reflex camera has a quick return mirror mechanism, and can quickly rotate a main mirror and a sub mirror between a position inside an optical path and a position outside the optical path.

At the position inside the optical path, each mirror is positioned at a predetermined stop position by abutting against a mirror down stopper provided in a mirror box, and introduces an incident light from an image-pickup lens to a finder optical system and a focus detection sensor unit. At the position outside the optical path, each mirror evacuates from the optical path by abutting against a mirror up stopper, and an incident light from the image-pickup lens reaches an image-pickup element when a shutter opens.

The quick return mirror mechanism has a spring driving the mirror, a charge mechanism charging the spring by a motor, and a mechanism switching the position inside the optical path and the position outside the optical path, and rotates the mirror by a combination of a link mechanism including the motor, a gear, and the spring.

When the mirror is quickly rotated from the position inside the optical path to the position outside the optical path, up bound phenomenon of the mirror is generated by a collision to the mirror up stopper. A release time lag can be shortened by shorting a time to stop the up bound phenomenon of the mirror, quickly evacuating the mirror outside the optical path for an image-pickup signal from a user, and starting an imaging operation such as a shutter running and an accumulation of the image-pickup element etc.

When the mirror is quickly rotated from the position outside the optical path to the position inside the optical path, down bound phenomenon of the mirror is generated by a collision to the mirror down stopper. The number of taking a picture of continuous shooting per unit time can be increased by shorting a time to stop the down bound phenomenon of the mirror, and early starting a focus operation.

Conventionally, the method of shorting the release time lag by making a spring stronger so as to speed up mirror drive and the method of shorting a mirror charge time by enlarging a motor are proposed to improve by making continuous shooting performance. However, these methods have faults such as the cost is high, the occupation volume is large, and the weight became heavy.

An image-pickup apparatus that drives the mirror by a voice coil motor is proposed in Japanese Patent Laid-Open No. 2010-44271 so as to resolve such a fault.

Moreover, the conventional quick return mirror mechanism had a lot of component counts, and the configuration of the mechanism is complex. In Japanese-Patent Laid-Open No. 11-95317, a mirror mechanism using an actuator of a linear method is proposed as the mechanism which is different from the conventional mechanism in order to displace the mirror quickly and stably, and miniaturize an apparatus.

In the prior art disclosed in Japanese Patent Laid-Open No. 2010-44271, applying an idling current to the voice coil and having a disc brake mechanism are disclosed so that the mirror is held on the position inside the optical path and the position outside the optical path when an electric power is on. Moreover, having a mirror lock mechanism is also disclosed so that the mirror is held on the position outside the optical path when the electric power is off. However, there were faults such as current consumption increases because the drive of the disc brake mechanism and the mirror lock mechanism consume current, cost so as to provide the disc brake mechanism and the mirror lock mechanism is high, and an occupied volume is large.

In the prior art disclosed in Japanese Patent Laid-Open No. 11-95317, the current consumption is remarkable because the actuator of the linear method is need to energize so that the mirror is held on the position inside the optical path and the position outside the optical path mirror. Additionally, the cost is high because the actuator of the linear method needs a lot of expensive magnets.

SUMMARY OF THE INVENTION

The present invention provides an image-pickup apparatus that includes a quick return mirror capable of performing a high-speed operation while suppressing a power consumption with a simple configuration at low cost.

An image-pickup apparatus as one aspect of the present invention includes a lead screw configured to rotate along with a motor, a moving member that is engaged with the lead screw and that is capable of moving by rotation of the lead screw, an image-pickup element configured to take an optical image formed by an image-pickup optical system, a mirror member that is capable of rotating between a first state in which the mirror member is positioned on an optical path from the image-pickup optical system to the image-pickup optical element and a second state in which the mirror member is positioned outside the optical path, an urging member that is arranged between the moving member and the mirror member and that is configured to urge at least of the moving member and the mirror member, and a first abutment member configured to abut against the mirror member when the mirror member is in the first state. An engagement portion parallel to a rotational axis of the mirror member is protruded from the mirror member. The engagement portion is held by both ends of the urging member when the mirror member rotates between the first state and the second state. A first end of the urging member elastically deforms so as to be apart from the engagement portion when the mirror member abuts against the first abutment member.

An image-pickup apparatus as another aspect of the present invention includes a lead screw configured to rotate along with a motor, a moving member that is engaged with the lead screw and that is capable of moving by rotation of the lead screw, an image-pickup element configured to take an optical image formed by an image-pickup optical system, a mirror member that is capable of rotating between a first state in which the mirror member is positioned on an optical path from the image-pickup optical system to the image-pickup optical element and a second state in which the mirror member is positioned outside the optical path, a rotating member that is rotatably attached to the mirror member, and engages to the moving member, an urging member configured to urge the rotating member so as not to rotate the rotating member relative to the mirror member, and a first abutment member configured to abut against the mirror member when the mirror member is in the first state. An engagement portion parallel to a rotational axis of the rotating member is protruded from the rotating member. The engagement portion is held by both ends of the urging member when the mirror member rotates between the first state and the second state. A first end of the urging member is apart from the engagement portion when the mirror member abuts against the first abutment member.

Further features of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Embodiment 1

Figure 1A:
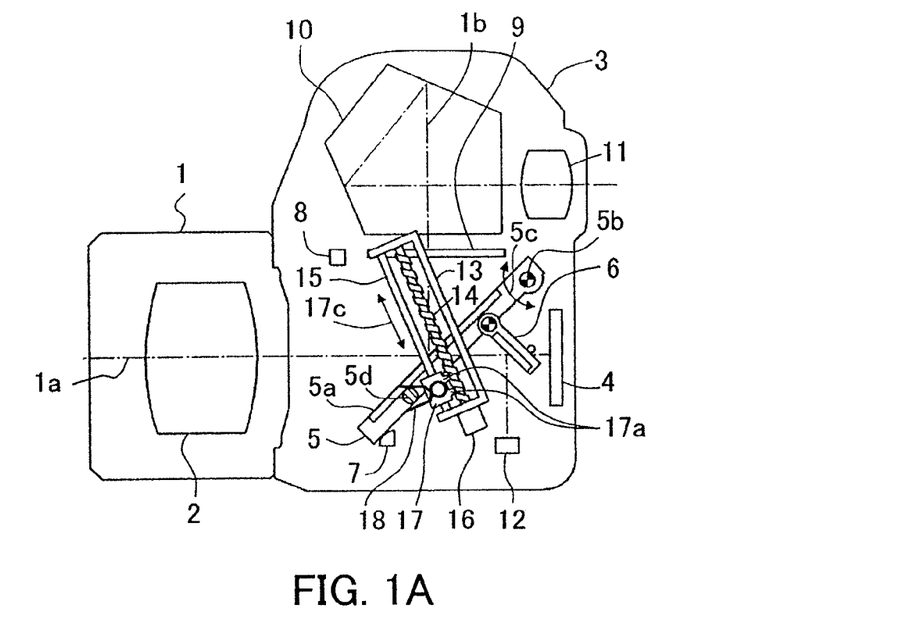
FIG. 1A and FIG. 1B are central cross-sectional views of a single lens reflex camera that is one example of an embodiment of an image-pickup apparatus of the present invention.
Figure 1B:
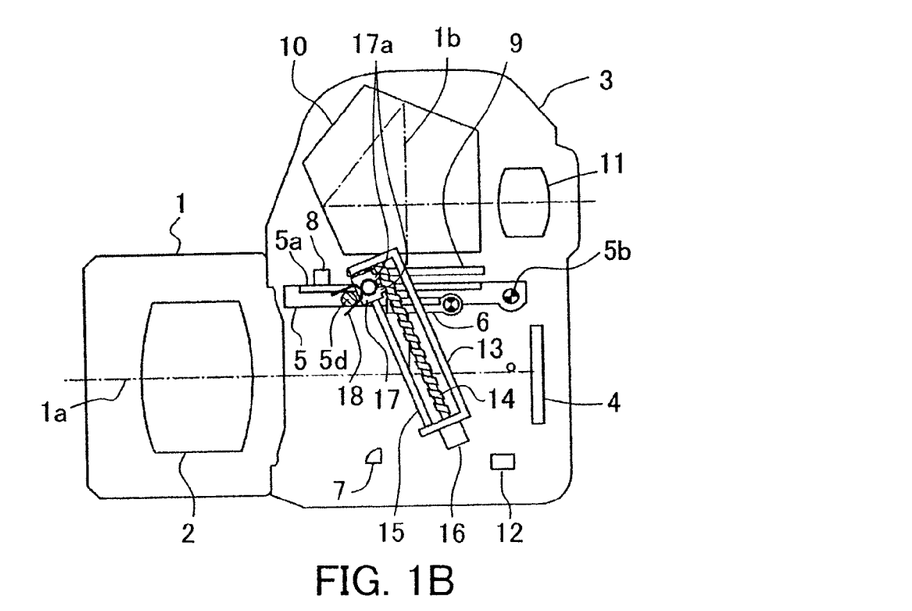

FIG. 1A and FIG. 1B are central cross-sectional views of a single lens reflex camera in Embodiment 1. FIG. 1A illustrates a state in which a main mirror is positioned on an optical path, and FIG. 1B illustrates a state in which the main mirror is positioned outside the optical path.

A digital single lens reflex camera that is a camera system includes a camera body 3 and an image-pickup lens (image-pickup optical system) 1 that is interchangeably mounted on the camera body 3. A lens 2 is provided inside the image-pickup lens 1, and is configured by a focus lens unit and a zoom lens unit. An optical low-pass filter, an infrared cut filter and an image-pickup element 4 that is an image-pickup unit including a photoelectric conversion element such as a CMOS sensor are arranged near an imaging plane of the image-pickup lens 1. A main mirror 5 has a half mirror portion 5a, which is supported rotatably around a rotation axis 5b in a direction of an arrow 5c.

As illustrated in FIG. 1A, a position of the main mirror 5 in a state where the main mirror 5 abuts against a down stopper 7 as a first mirror position regulation portion is defined as a first position. In this state, the main mirror 5 and a sub mirror 6 are inclined with respect to an optical axis 1a between the image-pickup lens 1 and the image pickup element 4. As illustrated in FIG. 1B, a position of the main mirror 5 in a state where the main mirror 5 abuts against an up stopper 8 as a second mirror position regulation portion and the main mirror 5 and the sub mirror 6 are removed from the optical path centering on the optical axis 1a is defined as a second position.

The sub mirror 6 is rotatably attached to the main mirror 5 and rotates in conjunction with the rotation of the main mirror. When the main mirror 5 is located at the first position, an incident light from the image-pickup lens 1 is reflected on the main mirror 5, and a reflected light is imaged on a mat surface of a screen 9 having the mat surface and a Fresnel surface, and introduced to an eye of photographer through a pentaprism 10 and an eyepiece optical system 11. An optical axis 1b shows an optical axis of the reflected right at the half mirror portion 5a of the main mirror 5. Additionally, a light transmitted the half mirror portion 5a of the main mirror 5 is reflected at the sub mirror 6 and is received at a focus detector 12. As shown in FIG. 1B, when the main mirror 5 is positioned at the second position, a light passed the lens 2 is imaged on the image-pickup element 4.

Figure 2:
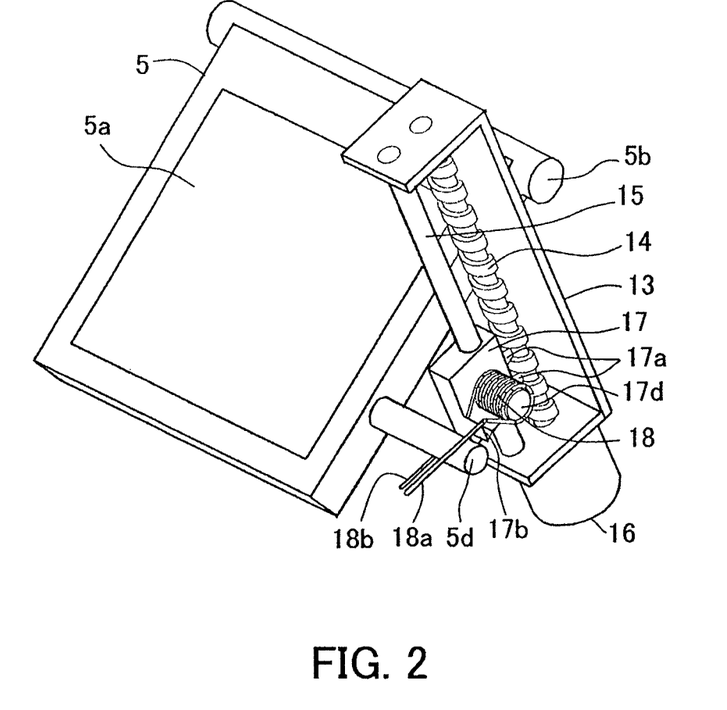
FIG. 2 is a perspective view of a mirror and a driving part of Embodiment 1.

Next, a driving portion driving the main mirror 5 is described. FIG. 2 is a perspective view of the main mirror 5 and the driving part.

A lead screw 14 and a guide axis 15 are arranged in an angle 13 arranged diagonally to the main mirror 5, and the lead screw 14 is connected to a rotational axis of a motor 16 as a rotational driving portion and can rotate along with the motor 16.

A rack (moving member) 17 has a convex portion 17a that engages with the lead screw 14, and is slidably attached to the guide axis 15. As a result, when the motor 16 drives, the rack 17 can move straight in a direction of an arrow 17c in FIG. 1A along the guide axis 15 via the lead screw 14 and the convex portion 17a. Additionally, the rack 17 has a spring rotation stopper 17b and a protruding portion 17d, and an urging spring (urging member) 18 is attached to the protruding portion 17d. A rotation of the urging spring 18 is restricted around the protruding portion 17d in a state where the spring rotation stopper 17b is held between an end portion 18a and an end portion 18b, and a precharge power is worked in the state. In other words, a force larger than a predetermined value is applied to the end portion 18a or the end portion 18b, and thus the end portion 18a or the end portion 18b can be apart from the spring rotation stopper 17b. Additionally, the urging spring 18 holds a driving protruding portion 5d attached to the main mirror 5, and the main mirror 5 rotates in accordance with a translation movement of the rack 17. In other words, the main mirror 5 is driven by engaging with the rack 17 via the urging spring 18.

FIGS. 3A to 3D are diagrams of illustrating positional relations of a driving portion and the main mirror 5. In FIGS. 3A to 3D, portions that are unrelated to the rotation operation of the main mirror 5 are omitted.

Figure 3A:
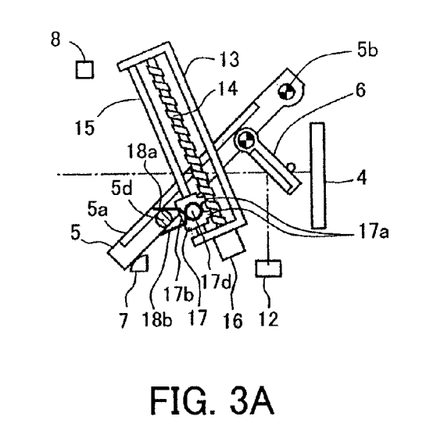
FIGS. 3A to 3D are diagrams of illustrating positional relations of a driving portion and the mirror of Embodiment 1.

FIG. 3A illustrates a state in which the main mirror 5 is located at the first position and the down stopper 7 urges the main mirror 5, which is a shooting standby state before or after turning on a power of a camera. In this case, the rack 17 is positioned at a first end of the moving range (bottom right position in FIG. 3A), and the end portion 18a of the urging spring urges to the driving protruding portion 5d by bending as illustrated in the drawing. As a result, the urging spring 18 urges the main mirror 5 at a position where the main mirror 5 abuts against the down stopper 7, and even if an inclination of the camera body 3 is changed or the camera body 3 vibrates, the main mirror 5 is stably held in the state where the main mirror 5 abuts against the down stopper 7.

When an energization to the motor 16 is cut off in the state of FIG. 3A, the rack 17 is urged in a direction (upper left direction in FIG. 3A) opposite to an urging direction by a reaction force of the urging force of the urging spring 18. However, the force so as to rotate the motor 16 through the lead screw 14 by the rack 17 decays by friction between the lead screw 14 and the convex portion 17a, and the rack 17 is held on the position of FIG. 3A by cogging torque of the motor 16.

Next, this condition is described in detail. M is the weight of the main mirror 5, the sub mirror 6, and the rack 17, and S is urging force of the urging spring 18. Additionally, T is the cogging torque of the motor 16, D is the effective diameter of the lead screw 14, L is the lead of the lead screw 14, α is the lead angle of the lead screw 14, and μ is friction coefficient of the lead screw 14. Then, motor cogging force F is represented as F=2T/D.

Since the rotational resistance of the motor at de-energization is friction between the lead screw 14 and the convex portion 17a, and cogging force F of the motor 16, in case of unfavorable position of the camera, the rack 17 stands still under the following conditions (friction between the rack 17 and the guide axis 15 strictly relates, but it is omitted since its value is small).

$$(M+S)\sin \alpha \leq \mu (M+S)\cos \alpha + F \cos \alpha$$

Actually, when strong vibration is applied, gravitational acceleration several times of weight and each designed value coupled with it is decided. Speed-up of mirror driving can be accomplished by being lead angle of the lead screw 14 big, but the designed value is decided by balancing need driving force of the rack 17 and stable holding force.

Figure 3B:
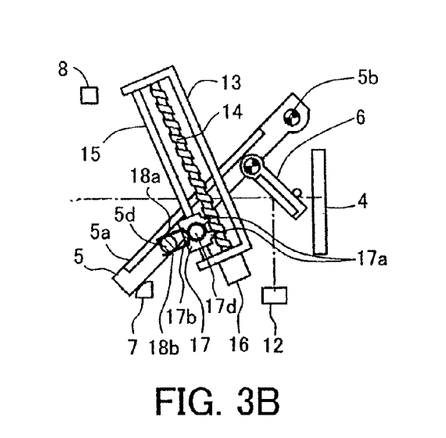

When a mirror-up operation for shooting starts, the lead screw 14 rotates by the rotary drive of the motor 16, and the rack 17 a little moves in an upper left direction from the state of FIG. 3A to the state of FIG. 3B. FIG. 3B shows that the main mirror 5 is positioned at the first position and the main mirror separates from the down stopper 7 or abuts against the down stopper 7. At this time, bending of the end portion 18a of the urging spring 18 is dissolved and urging force of the urging spring 18 does not operate to the driving protruding portion 5d.

Figure 3C:
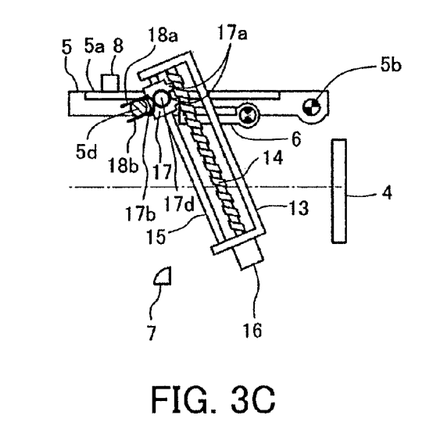

When the motor 16 further keeps rotating from the state of FIG. 3B, the end portion 18b pushes the driving protruding portion 5d along with the movement of the rack 17. And, the main mirror 5 engaging to the rack 17 through the urging spring 18 starts rotational transfer from the first position to the second position centering on the rotational axis 5b, and finally becomes the state of FIG. 3C. FIG. 3C shows that the main mirror 5 is positioned at the second position, and the main mirror 5 separates from the up stopper 8 or abuts against the up stopper 8. At this time, bending of the end portion 18b of the urging spring 18 is dissolved and urging force does not operate to the driving protruding portion 5d. Moreover, the sub mirror 6 is folded in conjunction with the main mirror 5 as shown in the drawing (an interlocking mechanism is omitted).

Figure 3D:
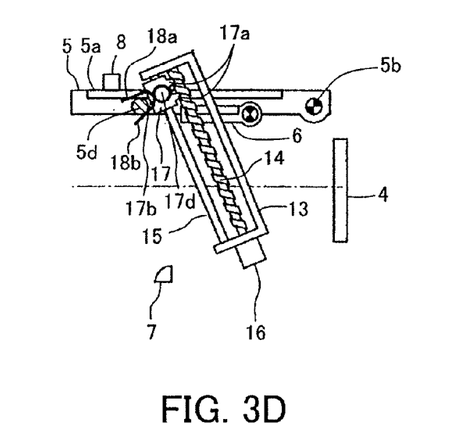

When the motor 16 further keeps rotating from the state of FIG. 3C, the rack 17 a little moves in an upper left direction from the state of FIG. 3C to the state of FIG. 3D. FIG. 3D shows that the rack 17 is positioned at a second end of the movement range (upper left position in FIG. 3D), the main mirror 5 is positioned at the second position, and the end portion 18b of the urging spring 18 urges to the driving protruding portion 5d by bending as shown in figure. The urging spring 18 urges the main mirror 5 to a position that abuts against the up stopper 8, and even if a position of the camera body 3 is changed and the camera body 3 vibrates, the main mirror 5 is stably hold in the state where the main mirror 5 abuts against the up stopper 8.

When an energization to the motor 16 is cut off in the state of FIG. 3D, the rack 17 is urged in a direction (bottom right direction in FIG. 3D) opposite to an urging direction by a reaction force of the urging force of the urging spring 18. However, the force so as to rotate the motor 16 through the lead screw 14 by the rack 17 decays by friction between the lead screw 14 and the convex portion 17a, and the rack 17 is held on the position of FIG. 3D by cogging torque of the motor 16.

When the main mirror 5 returns from the second position to the first position, it is only necessary to turn back from the state of FIG. 3D to the state of FIG. 3A by the inverse rotation of the motor 16.

Figure 4:
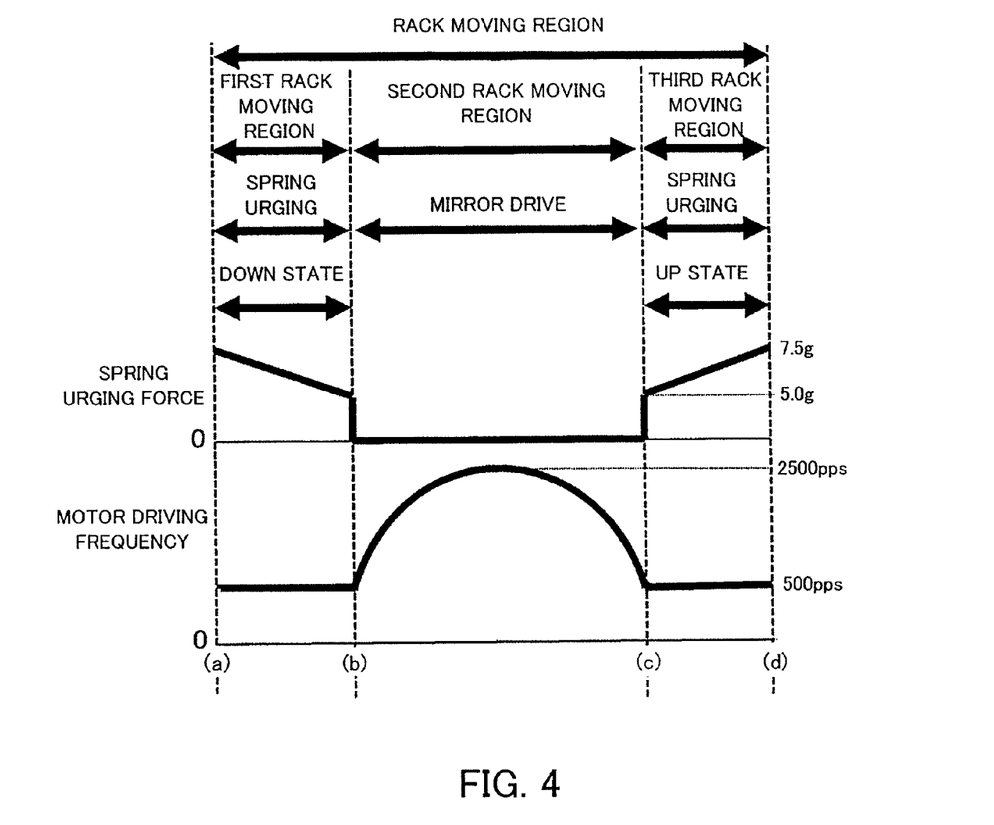
FIG. 4 is a diagram of illustrating a correlation of the motor, a rack, and the mirror of Embodiment 1.

Referring to FIG. 4, a relation between the driving of the motor 16 and the operations of the rack and the main mirror 5 is described. FIG. 4 is a diagram of illustrating a correlation of the motor 16, the rack 17 and the main mirror 5.

Characters (a)-(d) shown in a horizontal axis of FIG. 4 is corresponding to the states of FIGS. 3A to 3D, respectively. The moving region of the rack 17 are composed of three regions that include a first rack moving region from (a) to (b), a second rack moving region from (b) to (c), and third rack moving region from (c) to (d), in figure.

In the first rack moving region, when the motor 16 rotates, the urging spring 18 urges the main mirror 5 to the down stopper 7 as the first mirror position regulation portion. Then, the rack 17 moves straight, but the main mirror 5 does not move. In the second rack moving region, the main mirror 5 rotates from the first position to the second position or from the second position to the first position. Then, the urging spring 18 does not urge the main mirror 5. In the third rack moving region, when the motor 16 rotates, the urging spring 18 urges the main mirror 5 to the up stopper 8 as the second mirror position regulation portion. Then, the rack 17 moves straight, but the main mirror 5 does not move.

The urging force of the urging spring 18 becomes 7.5 g at (a) that is a moving region end portion of the first rack moving region, and becomes from 5.0 g to 0 g at (b) where the main mirror 5 abuts against the down stopper 7. In the second rack moving region, the urging force of the urging spring 18 is always 0 g. In the third rack moving region, the urging force of the urging spring 18 becomes from 0 g to 5.0 g at (c) where the main mirror 5 abuts against the up stopper 8, and become 7.5 g at (d) that is a moving region end portion of the applying power of applying power spring 18 is set to become 0 g from 5.0 g by (b) that is the moment when it becomes 7.5 g by (a) that is the edge of the moving region of the first rack moving region, and main mirror 5 touches down stopper 7. In the second rack moving region, it is set that 0 g is always maintained. It becomes 5.0 g from 0 g by (c) that is the moment when main mirror 5 touches improvement stopper 8 this, and it is set that it becomes 7.5 g in (d) that is the edge of the moving region in the third rack moving region. This due to the precharge force became 5.0 g when the end portion 18a and the end portion 18b of the urging spring 18 hold the rotation stopper 17b. Therefore, drive load is small and the main mirror 5 can speed up because the urging spring 18 need not urge when the main mirror 5 rotates.

When the main mirror 5 rotates to the second position and collides with the up stopper 8 at high speed, the main mirror 5 generates bound by colliding force. Because the main mirror 5 may enter into the region of the optical path during the generation of the bound, there is need to wait the receiving operation of the image-pickup element 4 until bound is statically determinate. Therefore, a release time lag becomes long.

Additionally, when the main mirror 5 rotates to the first position and collides with the down stopper 7 at high speed, the main mirror 5 generates bound by colliding force. Because the position of the sub mirror 6 is not stable during the generation of the bound, the focus detector 12 cannot operate the focus detection operation until the bound is statically determinate.

Then, in order to reduce the bound, the main mirror 5 slowly abuts against the down stopper 7 and the up stopper 8 in by controlling the drive of the motor 16 so as to slow down before arrival of the first position and the second position. Therefore, the light-receiving operation of the image-pickup element 4 and transition to the focus detection operation of the focus detector 12 can speed up. Thus, it is possible to accomplish shorting of the release time lag and a high-speed continuous shooting.

Therefore, the driving frequency of the motor is controlled at 500 pps in the first rack moving region, is controlled to decrease to 500 pps after increasing from 500 pps to 2500 pps in the second rack moving region, and is controlled at 500 pps in the third rack moving region. Thus, because the main mirror 5 is controlled at the low frequency due to deceleration at the moment in which the main mirror 5 abuts against the up stopper 8 or the down stopper 7, the bound at abutment can be significantly re6duced and the sound at the abutment is also silent. Additionally, because the motor 16 is controlled at the low frequency where the motor driving torque become big in the first rack moving region and the third rack moving region in which the urging spring 18 is needed to charge, plenty of room for the driving load margin can be left. As a whole, it is possible to accomplish speed-up including the shortening of the bound time.

As discussed above, the mechanism driven by the motor 16, the lead screw 14 and the rack 17 rotates the main mirror 5 in the embodiment 1 so that the mirror driving mechanism can be achieved by simple and a cheap configuration. Additionally, it is unnecessary to stop the driving of the rack 17 on the way of the lead screw 14, and to be strict the stop position accuracy of both ends by the configuration where the spring urges the stopper. Therefore, because the lead angle of the lead screw 14 can be big without receiving an influence from the stop position accuracy, speed-up of the mirror drive can be achieved. Further, even if the power supply of the motor 16 is cut off, the urging spring 18 stably holds the main mirror 5 at both ends of the moving region of the rack 17 by the optimization of the cogging force of the motor 16 and the friction between the lead screw 14 and the convex portion 17a of the rack 17. Thus, useless power consumption is not needed in this embodiment. Moreover, the present invention can achieve driving that is high-speed and high-torque needed the urge of the urging spring 18 so that the motor 16 is controlled to switch between the low speed drive and acceleration and deceleration drive according to the moving region of the rack 17. And because the main mirror 5 slows down before abutting against the stopper, the mirror bound is substantially reduced and the speed-up of the mirror can be achieved as a total.

The urging spring 18 urges the main mirror 5 at both the first position and the second position, but the urging at the second position may not rely on the urging spring 18 by using the vibration absorption material such as the sponges as the up stopper 8. In that case, the urging spring 18 may have the configuration that the end portion 18a just bends and the end portion 18b fixes. As a result, the main mirror 5 stably stops so as to crush the up stopper 8 at the second position. Under such a condition, when an energization to the motor 16 is cut off, the rack 17 is urged in the direction opposite to the urging direction by the reaction force of the up stopper 8. However, the force so as to rotate the motor 16 through the lead screw 14 by the rack 17 decays by friction between the lead screw 14 and the convex portion 17a, and the rack 17 is held on the second position by cogging torque of the motor 16. In this configuration, the moving region of the rack 17 has the first rack moving region and the second rack moving region.

Embodiment 2

The image-pickup apparatus in embodiment 2 of the present invention is described referring to FIGS. 5A to 5C and FIGS. 6A to 6D. The major differences between the image-pickup apparatus of embodiment 1 and the image-pickup apparatus of embodiment 2 is a component so as to attach an urging spring urging a mirror. The urging spring is attached to the rack in Embodiment 1, but the urging spring is attached to the main mirror in Embodiment 2. The same elements of embodiment 1 will be denoted by the same reference numerals and the duplicate descriptions thereof will be omitted.

Figure 5A:
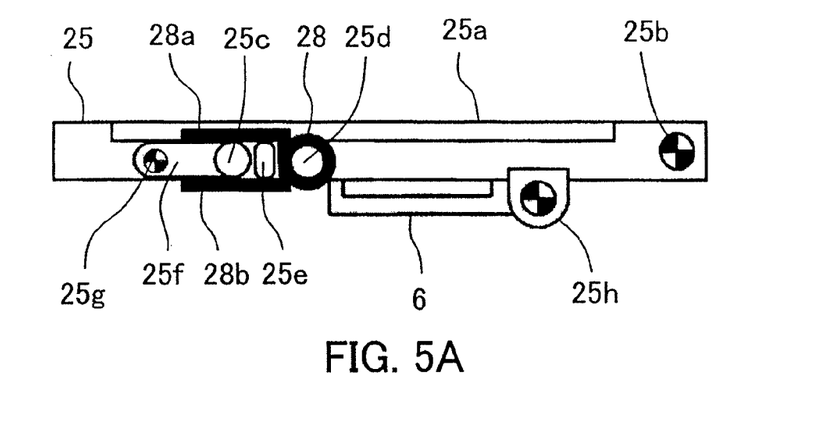
FIGS. 5A to 5C are configuration diagrams of a mirror unit of Embodiment 2.
Figure 5B:
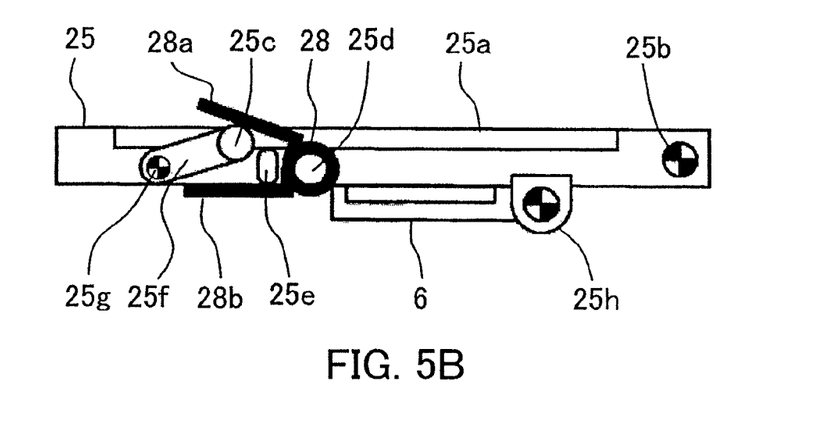
Figure 5C:
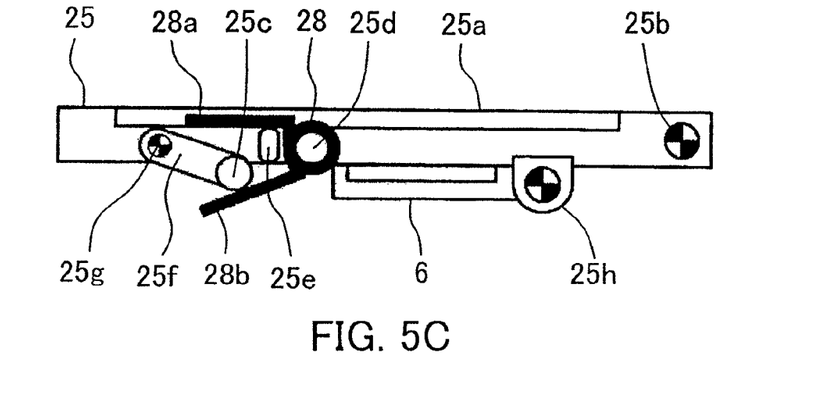

FIGS. 5A to 5C are configuration diagrams of a mirror unit of embodiment 2. The mirror unit has a main mirror 25, an arm member 25f, the sub mirror 6, and an urging spring 28. The main mirror 25 has a half mirror portion 25a and a sub mirror supporting portion 25h where the sub mirror 6 is rotatably attached. Additionally, the arm member 25f which can rotate within the predetermined angle around the rotational axis 25g is attached to the main mirror 25, and a driving protruding portion (protruding portion) 25c as a movable protruding portion is formed on the end of the arm member 25f. Further, the main mirror 25 has a spring rotation stopper 25e and a protruding portion 25d, and the urging spring 28 is attached to the protruding portion 25. A rotation of the urging spring is restricted centering on the protruding portion 25d in a state where the spring rotation stopper 25e is held between an end portion 28a and an end portion 28b, and a precharge power is worked in the state. Moreover, the arm member 25f is positioned so as to hold the driving protruding portion 25c between the end portion 28a and the end portion 28b of the urging spring 28.

FIG. 5A illustrates a state in which an outside force is not applied to the driving protruding portion 25c of the mirror unit, and in this state the arm member 25f is held so as to be parallel to the main mirror 25.

FIG. 5B shows that the driving protruding portion 25c of the mirror unit is rose in an upper direction of the figure with a power more than predetermined value. The driving protruding portion 25c rotates in a counterclockwise direction centering the rotational axis 25g, and the end portion 28a separates from the spring rotation stopper 25e when the power more than predetermined value is applied to the end portion 28a. When the position of the driving protruding portion 25c is restricted in this state, rotational power in clockwise direction of the figure around the rotational axis 25b is applied to the main mirror 25.

FIG. 5C shows that the driving protruding portion 25c of the mirror unit is rose in a bottom direction of the figure with a power more than predetermined value. The driving protruding portion 25c rotates in a clockwise direction centering the rotational axis 25g, and the end portion 28b separates from the spring rotation stopper 25e when the power more than predetermined value is applied to the end portion 28a. When the position of the driving protruding portion 25c is restricted in this state, rotational power in counterclockwise direction of the figure around the rotational axis 25b is applied to the main mirror 25.

Next, a driving part that rotates the main mirror 25 is described.

FIGS. 6A to 6D are figures that show a positional relation of the driving part and the mirror of the embodiment 2. In FIG. 6, unrelated to the rotation of the main mirror 25 is omitted. A rack 27 has a convex portion 27a that engages in the lead screw 14, and slidably attached to the guide axis 15. As a result, when the motor 16 drives, the rack 27 moves straight along to the guide axis 15 through the lead screw 14 and the convex portion 27a. Additionally, the rack 27 engages in the driving protruding portion 25c, and the main mirror 25 rotates around the rotational axis 25b by translation moving of the rack 27.

Figure 6A:
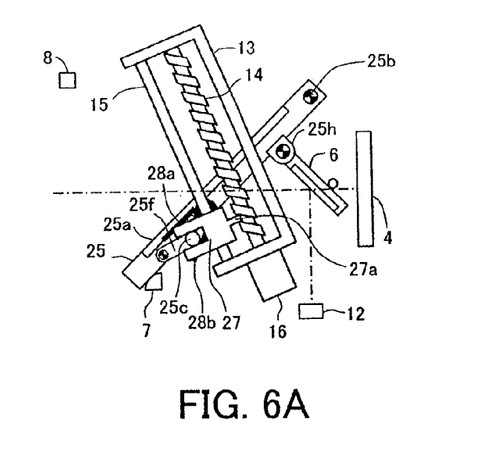
FIGS. 6A to 6D are diagrams of illustrating positional relations of a driving part and the mirror of Embodiment 2.

FIG. 6A shows that the main mirror 25 is positioned at the first position, the down stopper 7 urges the main mirror 25, and a camera is a state before power-on and a shooting standby state after power-on. Then, the rack 27 is positioned at a first end of the moving range (bottom right position in FIG. 6A), and the end portion 28b of the urging spring urges to the driving protruding portion 25c by bending as shown in figure. The urging spring 28 urges the main mirror 25 to a position that abuts against the down stopper 7, and even if a position of the camera body 3 is changed and the camera body 3 vibrates, the main mirror 25 is stably held in the state where the main mirror 5 abuts against the down stopper 7.

When an energization to the motor 16 is cut off in the state of FIG. 6A, the rack 27 is urged in a direction (upper left direction in FIG. 6A) opposite to an urging direction by a reaction force of the urging force of the urging spring 28. However, the force so as to rotate the motor 16 through the lead screw 14 by the rack 27 decays by friction between the lead screw 14 and the convex portion 27a, and the rack 27 is held on the position of FIG. 6A by cogging torque of the motor 16. The explanation is omitted as the detail is similar to the embodiment 1.

Figure 6B:
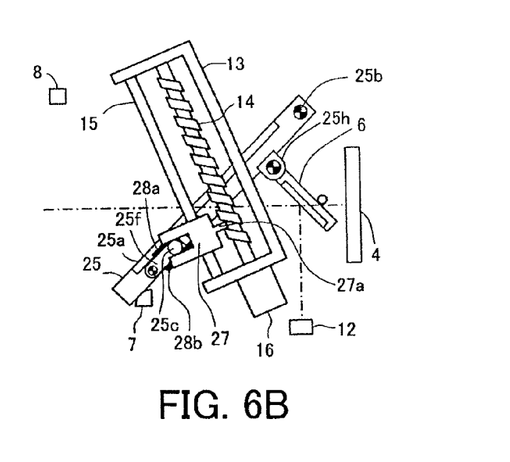

When a mirror-up operation for shooting starts, the lead screw 14 rotates by the rotary drive of the motor 16, and the rack 27 a little moves in an upper left direction from the state of FIG. 6A to the state of FIG. 6B. FIG. 6B shows that the main mirror 25 is positioned at the first position and the main mirror 25 separates from the down stopper 27 or abuts against the down stopper 7. At this time, bending of the end portion 28b of the urging spring 28 is dissolved and urging force of the urging spring 28 does not operate to the driving protruding portion 25c.

Figure 6C:
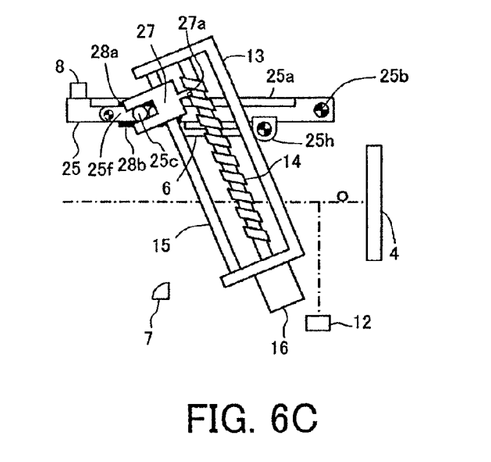

When the motor 16 further keeps rotating from the state of FIG. 6B, the main mirror 25 engaging to the rack 27 starts rotational transfer from the first position to the second position centering on the rotational axis 25b along with the movement of the rack 17, and finally becomes the state of FIG. 6C. FIG. 6C shows that the main mirror 25 is positioned at the second position, and the main mirror 25 separates from the up stopper 8 or abuts against the up stopper 8. At this time, bending of the end portion 28b of the urging spring 28 is dissolved and urging force does not operate to the driving protruding portion 25c. Moreover, the sub mirror 6 is folded in conjunction with the main mirror 25 as shown in figure.

Figure 6D:
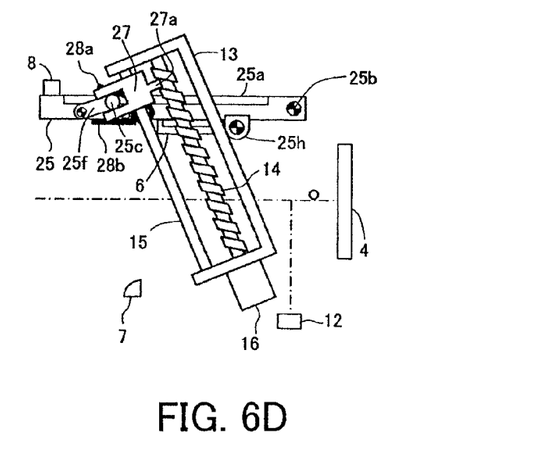

When the motor 16 further keeps rotating from the state of FIG. 6C, the rack 27 a little moves in an upper left direction from the state of FIG. 6C to the state of FIG. 6D. FIG. 6D shows that the rack 27 is positioned at a second end of the movement range (upper left position in FIG. 6D), the main mirror 25 is positioned at the second position, and the end portion 28a of the urging spring 28 urges to the driving protruding portion 25c by bending as shown in figure. The urging spring 28 urges the main mirror 25 to a position that abuts against the up stopper 8, and even if a position of the camera body 3 is changed and the camera body 3 vibrates, the main mirror 25 is stably held in the state where the main mirror 25 abuts against the up stopper 8.

When an energization to the motor 16 is cut off in the state of FIG. 6D, the rack 27 is urged in a direction (bottom right direction in FIG. 6D) opposite to an urging direction by a reaction force of the urging force of the urging spring 28. However, the force so as to rotate the motor 16 through the lead screw 14 by the rack 27 decays by friction between the lead screw 14 and the convex portion 27a, and the rack 27 is held on the position of FIG. 6D by cogging torque of the motor 16.

When the main mirror 25 returns from the second position to the first position, it is only necessary to turn back from the state of FIG. 6D to the state of FIG. 6A by the inverse rotation of the motor 16.

As explained above, the main mirror 25 is driven by engaging the driving protruding portion 25c with the rack 27 Additionally, the driving protruding portion 25c is urged by the urging spring 28 when the maim mirror 25 is positioned at the first position or the second position, and is not urged when the main mirror 25 drives between the first position and the second position.

The explanation is omitted as the driving control of the motor 16 is similar to the embodiment 1.

As discussed above, the mechanism driven by the motor 16, the lead screw 14, and the rack 27 rotates the main mirror 25 in the embodiment 2 so that the mirror driving mechanism can be achieved by simple and cheap configuration. Additionally, it is unnecessary to stop the driving of the rack 27 on the way of the lead screw 14, and to be strict the stop position accuracy of both ends by the configuration where the spring urges the stopper. Therefore, because the lead angle of the lead screw 14 can be big without receiving an influence from the stop position accuracy, speed-up of the mirror drive can be achieved. Further, even if the power supply of the motor 16 is cut off, the urging spring 28 stably holds the main mirror 5 at both ends of the moving region of the rack 27 by the optimization of the cogging force of the motor 16 and the friction between the lead screw 14 and the rack 27. Thus, useless power consumption is not needed in this embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-115263, filed on May 21, 2012, which is hereby incorporated by reference herein in its entirety.

What is claimed is:

1. An image-pickup apparatus comprising:
a lead screw configured to rotate along with a motor;
a moving member that is engaged with the lead screw and that is capable of moving by rotation of the lead screw;
an image-pickup element configured to take an optical image formed by an image-pickup optical system;
a mirror member that is capable of rotating between a first state in which the mirror member is positioned on an optical path from the image-pickup optical system to the image-pickup optical element and a second state in which the mirror member is positioned outside the optical path;
an urging member that is arranged between the moving member and the mirror member and that is configured to urge at least one of the moving member and the mirror member; and
a first abutment member configured to abut against the mirror member when the mirror member is in the first state,
wherein an engagement portion parallel to a rotational axis of the mirror member is protruded from the mirror member,
wherein the engagement portion is held by both ends of the urging member when the mirror member rotates between the first state and the second state, and wherein a first end of the urging member elastically deforms so as to be apart from the engagement portion when the mirror member abuts against the first abutment member.

2. The image-pickup apparatus according to claim 1, further comprising:
a second abutment member configured to abut against the mirror member when the mirror member is in the second state,
wherein a second end of the urging member elastically deforms so as to be apart from the engagement portion when the mirror member abuts against the second abutment member.

3. The image-pickup apparatus according to claim 1, further comprising:
a second abutment member configured to abut against the mirror member when the mirror member is in the second state,
wherein the second abutment member is made of a material that absorbs vibration, and
wherein a second end of the urging member is fixed and does not elastically deform so as to be apart from the engagement portion when the mirror member abuts against the second abutment member.

4. An image-pickup apparatus comprising:
a lead screw configured to rotate along with a motor;
a moving member that is engaged with the lead screw and that is capable of moving by rotation of the lead screw;
an image-pickup element configured to take an optical image formed by an image-pickup optical system;
a mirror member that is capable of rotating between a first state in which the mirror member is positioned on an optical path from the image-pickup optical system to the image-pickup optical element and a second state in which the mirror member is positioned outside the optical path;
a rotating member that is rotatably attached to the mirror member, and engages to the moving member;
an urging member configured to urge the rotating member so as not to rotate the rotating member relative to the mirror member; and
a first abutment member configured to abut against the mirror member when the mirror member is in the first state,
wherein an engagement portion parallel to a rotational axis of the rotating member is protruded from the rotating member,
wherein the engagement portion is held by both ends of the urging member when the mirror member rotates between the first state and the second state, and
wherein a first end of the urging member is apart from the engagement portion when the mirror member abuts against the first abutment member.

5. An image-pickup apparatus according to claim 4, further comprising:
a second abutment member configured to abut against the mirror member when the mirror member is in the second state;
wherein a second end of the urging member is apart from the engagement portion when the mirror member abuts against the second abutment member.

6. The image-pickup apparatus according to claim 4, further comprising:
a second abutment member configured to abut against the mirror member when the mirror member is in the second state;
wherein the second abutment member is made of a material that absorbs vibration, and
wherein a second end of the urging member is fixed and does not elastically deform so as to be apart from the engagement portion when the mirror member abuts against the second abutment member.

* * * * *